United States Patent [19]
Tucker

[11] Patent Number: 6,102,539
[45] Date of Patent: Aug. 15, 2000

[54] SUNGLASS LENS LAMINATE

[75] Inventor: John F. Tucker, Rochester, N.Y.

[73] Assignee: Luxottica Leasing S.p.A., Agordo, Italy

[21] Appl. No.: 09/313,498

[22] Filed: May 17, 1999

Related U.S. Application Data

[63] Continuation-in-part of application No. 09/105,518, Jun. 26, 1998, Pat. No. 5,926,248.

[51] Int. Cl.⁷ ........................................ G02C 7/10
[52] U.S. Cl. ........................... 351/44; 351/49; 351/163
[58] Field of Search ........................ 351/44, 163, 165, 351/178, 49

[56] References Cited

U.S. PATENT DOCUMENTS

| | | | |
|---|---|---|---|
| 4,227,950 | 10/1980 | Spycher | 156/85 |
| 4,793,703 | 12/1988 | Fretz | 351/163 |
| 4,883,548 | 11/1989 | Onoki | 351/163 |
| 5,135,298 | 8/1992 | Feltman | 351/163 |
| 5,323,191 | 6/1994 | Firtion | 351/159 |
| 5,351,100 | 9/1994 | Schwenzfeier | 351/164 |
| 5,364,487 | 11/1994 | Friske | 156/309.9 |
| 5,618,863 | 4/1997 | D'Errico | 524/91 |
| 5,751,481 | 5/1998 | Dalzell | 351/163 |
| 5,926,248 | 7/1999 | Tucker | 351/44 |

FOREIGN PATENT DOCUMENTS

| | | | |
|---|---|---|---|
| 60-205429 | 10/1985 | Japan | G02F 1/17 |
| 96/27496 | 9/1996 | WIPO | B32B 9/04 |
| 97/22894 | 6/1997 | WIPO | G02B 1/00 |

*Primary Examiner*—Huy Mai
*Attorney, Agent, or Firm*—Katherine McGuire

[57] ABSTRACT

An improved sunglass lens laminate has first and second lens portions joined by an adhesive, wherein the adhesive at least one of (1) an ultraviolet absorber in an amount sufficient to block substantially all solar radiation up to about 400 nm, and (2) a dye to provide selected visible light transmission characteristics to the laminate. In a preferred embodiment, a polarizing film is disposed between two lens portions to form a polarizing sunglass lens laminate.

29 Claims, 2 Drawing Sheets

SUNGLASS LENS LAMINATE

CROSS-REFERENCE TO RELATED APPLICATION

This application is a continuation-in-part of applicant's U.S. patent application Ser. No. 09/105,518, filed Jun. 26, 1998, now U.S. Pat. No. 5,926,248, the disclosure of which is incorporated herein by reference.

FIELD OF THE INVENTION

This invention relates to sunglass lenses, both prescription and nonprescription and, more particularly, to sunglass lenses having a laminated construction that have improved utraviolet absorption and/or selected visible light transmission transmission characteristics.

BACKGROUND OF THE INVENTION

Sunglasses have been used for many years as cosmetic devices and to reduce the intensity of visible light. More recently, they have come to be seen as important in protecting a wearer's eyes from exposure to harmful solar radiation, in particular, ultraviolet (UV) rays that can cause irreparable damage to the eye. Visible light ranges from about 700 nm to 380 nm, the region below about 380 nm being considered the ultraviolet region. Wavelengths from 290 to 315 nm, referred to as UVB, are potentially more damaging than those in the range of 315 to 380 nm, referred to as UVA. Excessive exposure of the eyes to ultraviolet rays can damage the cornea and lens of the eye, and longtime exposure to UV radiation contributes to some types of cataracts. The light sensitive retina at the back of the eye can also be injured because the lens shields it from UV rays.

The lenses of higher quality sunglasses contain UV absorbers to protect the wearer's eyes from these damaging rays. UV absorbers are often included in the glass or plastic material used to make the lenses. They have also been included in lens coatings and, in the case of polarized lenses discussed in more detail below, in polarizing film laminated into the lens structure.

Sunglasses are familiar devices generally constructed from a frame and one or more lenses. The lenses may be glass or plastic. These lens materials may contain light absorbing dyes and ultraviolet inhibiting chemicals and may have one or more coatings applied to the lens after it is formed.

While most sunglass lenses have a unitary construction using a single piece of lens material, some lenses are made from laminate materials. One type of laminate lens is a glass-plastic composite lens that combines the light weight of a plastic lens with the superior surface and optical qualities of glass. Examples of such composite lenses are found in U.S. Pat. Nos. 4,227,950, 5,323,191, and 5,364,487, the disclosures of which are incorporated herein by reference. These composites are usually formed by bonding preformed glass and plastic elements with an adhesive, although U.S. Pat. No. 4,227,950 teaches casting the plastic lens element against a preformed glass lens element. Also, U.S. Pat. No. 5,351,100 discloses a glass multifocal ophthalmic lens formed by fusing a glass multifocal lens portion to the convex outer surface of a second lens portion.

A distinct class of sunglass lens laminates comprises those incorporating polarizing films. Light waves from the sun are random non-polarized waves that, on reflection from a flat surface, become directional, or polarized. Glare is an example of light waves that have been restricted to one plane. Polarized sunglasses, which are effective at cutting surface reflection from flat surfaces such as water, ice, or roads, have lenses that typically include a polarizing layer laminated between two lens portions. Polarized sunglasses filter out glare, ultraviolet waves, and other random light by use of a polarized light filtering film commonly made of polyvinyl alcohol dyed with iodine. This film is constructed so that its crystal molecules are aligned in parallel lines. Light waves perpendicular to the plane of the crystals are blocked and light waves in the same plane as the crystals pass through the membrane, as described in U.S. Pat. No. 5,135,298.

Some adhesives used in lamination of lens portions have low concentrations of UV absorbers to prevent yellowing of the adhesive upon exposure to UV light, as described in U.S. Pat. No. 5,618,863, the disclosure of which is incorporated herein by reference.

There are many commercial examples of polarized lenses on the market. One type includes lenses that consist of two tempered clear glass lens portions. Another type includes lenses that consist of a tempered clear front glass and an untempered colored rear glass, with a mirror surface on the external convex surface and an antireflective coating on the external concave surface. Color may be added to the polarizing film and also incorporated into the rear lens. Another type of commercial lens has a clear and untempered front glass together with a clear and tempered rear glass, the mirror being on the front lens internal surface and the antireflective surface on the rear lens external surface. Color is in the polarizing film only. The laminates containing the polarizing film are usually prepared using an adhesive curable with ultraviolet light.

The manufacture of currently available polarizing lenses is a complex, time-consuming procedure with inconsistent results. Multiple lens portions must be kept in inventory and a high quantity of lenses failing quality tests leads to high costs. Furthermore, the polarization efficiency and the color transmission characteristics of the lens laminates may degrade unacceptably as a result of exposure to ultraviolet light during use.

SUMMARY OF THE INVENTION

The present invention is directed to improved sunglass lens laminates formed by binding two lenses together using an adhesive containing at least one of (1) an ultraviolet absorber in an amount sufficient to block substantially all solar radiation, including UVA radiation, up to about 400 nm, and (2) a dye to provide selected visible light transmission characteristics to the laminate. Many advantages flow from use of this kind of adhesive, some of which will be apparent to those skilled in the art. For example, the adhesive may be used to supplement the UV-absorption capacity of other components or shift the color of the laminate.

Particular advantages of this invention are found, however, when UV absorber-containing adhesives are used to prepare laminates containing a polarizing film. The polarizing film in the laminates of this invention is encased in UV-absorbing layers that protect the polarizing film and mitigate the degradation of polarization efficiency and the undesirable changes in transmission hue and intensity that can result from exposure to UV radiation. In embodiments where the polarizing film also includes dyes to reduce the intensity of visible light and provide desired cosmetic effects, the UV-absorbing layers formed by the cured adhesive of this invention reduce fading and lengthen the useful life of the sunglass lens.

DETAILED DESCRIPTION OF THE INVENTION

Figure 1:
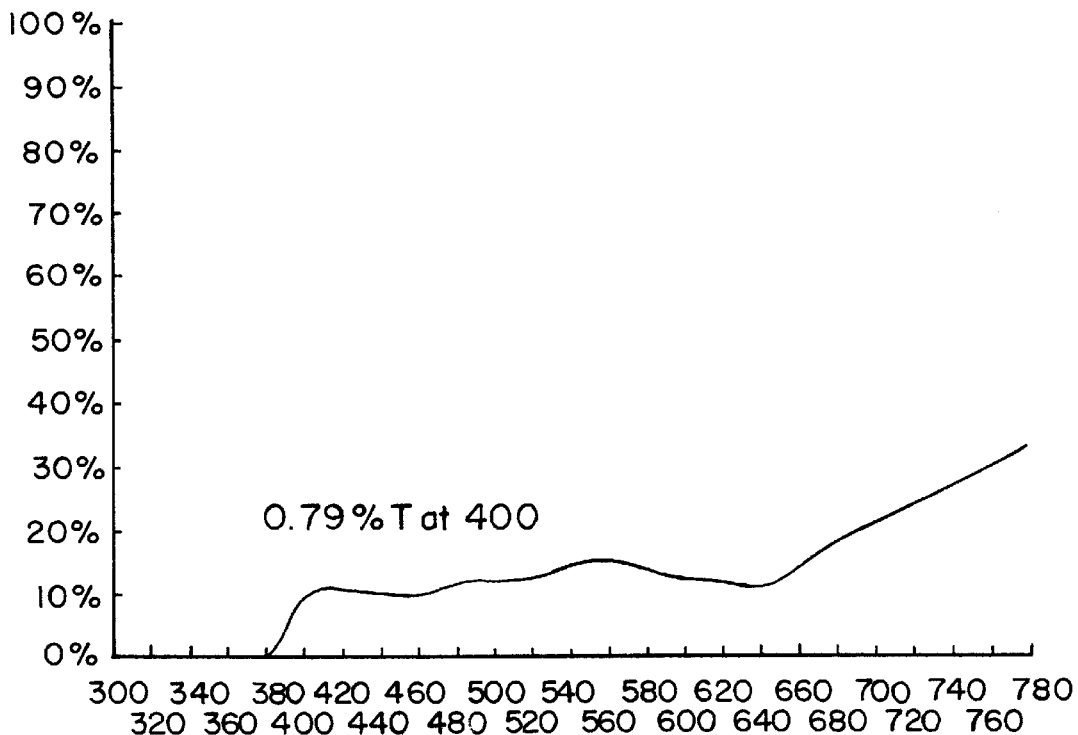
FIG. 1 is a transmission spectrum for a laminate formed using an adhesive containing a UV absorber.

In accordance with the present invention, an improved sunglass laminate comprises first and second lens portions joined by an adhesive containing ultraviolet absorber and/or a dye that provides selected transmission characteristics to the laminate. In previously known lens laminates in which one of the lens portions has ultraviolet-absorbing properties and a ultraviolet-cured adhesive is used to make the laminate, proper cure of the adhesive is difficult to achieve because of the effect of the ultraviolet-absorbing lens portion on the cure process. Making lenses using the methods described below allows faster, more uniform curing of the adhesive and results in higher quality product.

In another distinct aspect of this invention, it has been found that the use of visible light initiators to cure the adhesive in the lens laminate surprisingly increases lens quality, produces better finished lens optics, and significantly increases manufacturing yields. This aspect of the invention has particular value in the production of polarizing sunglass lenses. The tendency of a polarizing film included in a lens laminate to wrinkle during assembly and cure of the laminate structure is an aggravating problem. Use of visible light initiators in the adhesive and use of visible light radiation during cure minimizes this wrinkling problem.

Related to the use of visible light initiators in the adhesive is the importance of avoiding overheating of the laminate structure during the cure process, and especially during the initial portions of the cure process. In this regard, best results are obtained if the temperature of the laminate during cure is less than 140° F., preferably less than 120° F.

The lens portions used in this invention may be formed from any plastic or glass materials known to be useful for making sunglass lenses. As will be apparent to those skilled in the art, the laminates may be designed as plano lenses or as lenses having optical power for refractive correction. Coatings may be applied to lens portions, either before or, preferably, after formation of the laminate.

Selection of adhesives useful in making the lens laminates of this invention is within the skill of the art. In general, preferred adhesives are chemically compatible with the other components of the laminate, have substantially the same or similar index of refraction as that of the lens portions, and have a high degree of transparency and color fastness. The adhesive is preferably provided in a liquid form and should be compatible with and capable of dissolving the ultraviolet absorber. In the lens embodiment incorporating a polarizing film in the core of the laminate, the adhesive preferably protects the polarizing core from corrosive chemical environments. The adhesives may be curable by ultraviolet light, visible light, heat, sealing pressure or by any combination of thereof. Preferably, the adhesive contains a photoinitiator that can be activated either by visible or UV light, visible light initiators being preferred. Use of heat and pressure to cure the adhesive is unsuitable for fragile laminate components such as glass and polarizing film. It is especially important to avoid high temperatures, i.e., temperatures exceeding about 140° F., during the cure cycle when incorporating a polarizing film into the lens laminate. More preferably, the temperature during cure will not exceed about 120° F.

Adhesives useful in the laminates of this invention include methacrylates, epoxies, polyurethanes, poly(vinyl) acetals, and poly(vinyl) butyrals. Urethane-modified acrylic adhesives are presently preferred adhesives. This latter type of adhesive is illustrated in the following examples.

The adhesive, which preferably is completely solid upon curing, should be compatible with the lens portions being laminated. Additionally, it is necessary that there be no release of volatile materials during curing to avoid formation of bubbles between the components of the lens laminate. The adhesive should also have a consistency such that it can be applied to the lens portion and not diffuse to the edges too quickly. A reasonable viscosity for efficient application of the adhesive is between 500 and 1500 cps, as measured by a Brookfield viscometer.

By using a combination of UV and visible light to cure the adhesive, less heat is generated, and the temperature is more controlled than when UV radiation alone is used. The negative effects of heat such as the wrinkling of polarizing film are thereby avoided. Moreover, the time required for a complete cure is substantially less. By forming a laminate having optically clear glass on both sides of the polarized film, the adhesive can be cured on both sides to achieve uniform curing in a short period of time. The inventor has discovered that excessive heat can be generated when employing commercial adhesives, particularly urethane modified acrylic adhesives containing UV initiators. The problem of excessive heat is minimize and cure time is reduced by adding visible light initiators to the adhesive and using visible light to cure the adhesive.

Selecting the amount of initiator employed in the adhesive is within the skill of the art. Commercial forms of the currently preferred urethane-modified acrylic adhesives are commonly provided with UV initiators. One highly preferred adhesive is such a commercial adhesive supplemented with added visible light photoinitiator. The amount of visible light photoinitiator added is not narrowly critical, although concentrations within the range of 0.5–1.5 weight percent have been found to give desirable results. Another highly preferred adhesive is one containing only visible light photoinitiator. However, the commercial availability of such adhesives that are also compatible with other components of the lens laminate is limited.

Selection of the UV absorber included in the adhesive employed to form the laminate of this invention is not narrowly critical. The absorber should, of course, be uniformly distributed or dissolved in the adhesive and should be chemically compatible with the other adhesive components. With this qualification, any of the UV absorbers known to be useful for sunglass lenses may be used in the lens laminates of this invention. Presently preferred absorbers are benzotriazoles, benzophenones, and derivatives of benzotriazoles and benzophenones. Especially preferred UV absorbers are benzophenones and benzophenone derivatives.

The amount of UV absorber included in the adhesive should be sufficient, after formation of the lens laminate, to block substantially all solar radiation up to about 400 nm, including substantially all the UVA. Preferably, more than 99.9 percent of solar UVA radiation is blocked by the lens laminates of this invention. UVA absorption of lenses is determined by methods established by the American National Standards Institute (ANSI Z80.3-1996). The present invention extends radiation blocking to the visible spectral region nearest the UVA region for improved protection of the eyes against possible radiation-induced damage.

The upper limit of the amount of absorber included is determined by the solubility limit of the particular absorber selected in the adhesive. Presently preferred UV absorber concentrations in the adhesive used to form the lens laminates are within the range from about 1 to about 5 weight percent, more preferably from about 1.5 to about 2.5 weight percent.

In addition to UV absorbers, laminating adhesives in accordance with the present invention include dyes for providing selected transmission characteristics to the sunglass laminate. The dyes in the adhesive can serve, for example, to compensate for undesirable color in the lens portions of the laminate or to provide enhanced or visual detail by selective transmission blocking within a specified visible spectral region. Any dyes that are soluble in the adhesive formulation and compatible with other components of the adhesive can be used. Preferably the dyes will also have good light and heat stability. Useful dyes for such purposes include azo dyes and metallized azo dyes, which can be incorporated in the adhesive in amounts preferably from about 0.001 to about 1.0 weight percent, more preferably, from about 0.01 to about 0.10 weight percent.

Like the other components of the lens laminate of this invention, selection of the polarizing film is within the skill of the art and is not narrowly critical to this invention. Any of the polarizing film known to be useful for making sunglass lenses may be used to make the laminates of this invention. Currently preferred polarizing film is a polyvinyl alcohol and iodine film. The film can be provided as a disk with a certain base curve that can be cut to the proper diameter for incorporation into the lens laminate. Additionally, the polarizing film may contain dyes to impart various colors to the lens laminate and to adjust the visible light transmittance characteristics of the lens. Films are currently available in wide range of colors and transmittances.

Manufacture of the lens laminates of this invention is illustrated in the following examples and will be further illustrated here by a description of a preferred process for making the polarizing lens laminates of this invention. Two suitable lens portions and a polarizing film are selected and prepared for lamination by shaping and cleaning using methods familiar to those skilled in the art. Adhesive is placed on the inner surfaces of the two lens portions and on both surfaces of the polarizing film. The components of the laminate are assembled and allowed to stand for a time sufficient for the adhesive to spread across the surfaces of the component. The assembly is then pressed to even out the adhesive thickness and ensure a uniform contact between the laminate components. The adhesive of the pressed assembly is then cured by exposure to the appropriate initiating energy. For example, when using the preferred urethane-modified acrylic adhesive containing a combination of UV and visible light photoinitiators, curing may be accomplished by exposing each side of the assembly to about 1.5 joules UVA per cubic centimeter, 0.47 joules UVB per cubic centimeter, and 0.74 joules visible light per cubic centimeter. To assure completeness of cure, a post-cure has been found desirable. Again, when using the preferred urethane-modified acrylic adhesive with UV and visible light photoinitiators, the post-cure may be accomplished by exposing each side of the laminate to 6.6 joules UVA per cubic centimeter, 2.0 joules UVB per cubic centimeter, and 3.2 joules visible light per cubic centimeter. The foregoing description including that of the curing procedure is merely illustrative of the techniques that may be used to form the lens laminates of this invention.

Lens Preparation

An adhesive is prepared from Loctite® 3491, a urethane-modified acrylic adhesive containing 1–3 weight percent of a UV initiator. To the Loctite® 3491 is added 0.5 percent Irgacure® 819 visible light initiator and 1.5 percent Tinuvin® 328 UV absorber. Irgacure® 819 is a phenylbis(2,4,6-trimethyl benzoyl)-phosphine oxide, available from Ciba-Geigy (CASRN: 162881-26-7). Tinuvin® 328 is 2-(2-hydroxy-3,5-di-tert-amylphenyl)benzotriazole (CAS #25973-55-1), available from Ciba-Geigy.

A second adhesive is prepared using Loctite® 3491, 1.5 weight percent Irgacure® 819 visible light initiator, and 4 weight percent 2,2'-dihydroxy-4-methoxybenzophenone (CAS#000131-53-3), available as Cyasorb® UV-24 from CYTEC Industries, Inc.

Polarizing film from Yamato International is cut into circular forms with a 1.378 inch radius. These forms are blown off with an ionizing air gun. Lens portions are prepared from S3 glass blanks obtained from Schott Glass. The blanks are ground to shape, polished, tempered, and ultrasonically cleaned and rinsed.

A "laminate stack" is made with two S3 glass lens portions having the polarizing film between them. The laminate stack is opened, and 0.12 to 0.14 gram of the adhesive is dispensed to the concave side of the outer lens portion. The same amount of adhesive is also dispensed to the convex side of the polarizing film. After the film is laid down on the outer lens, 0.12 to 0.14 gram of adhesive is dispensed to the concave side of the film. The same amount of adhesive is dispensed to the convex side of the inner lens portion. The inner lens portion is then laid on the film. The laminate stack is allowed to rest for approximately 5 minutes to allow adhesive to wick to the edge of the lens. After the adhesive has completely spread to the outer edges, the laminate stack is pressed at about 60 psi for about 10 seconds.

Curing is done by exposing the lens stack to a Fusion D lamp, available from Fusion UV System, Inc. The Fusion D lamp emits UVA, UVB, and visible radiation. Exposure is accomplished by placing the lens stack on a conveyor belt 2 inches from the UV lamp and setting the belt speed so that the lens is exposed for 5 seconds per pass. After the first pass, the lens stack is turned over and the other side is exposed for the same length of time. The lenses so formed are cleaned and inspected for defects.

The adhesives described above were each used to prepare a gray polarizing laminates by the procedure just described. FIG. 1, a plot of transmission versus wavelength obtained for a laminate formed using the adhesive containing Tinuvin® 328 UV absorber, shows substantially complete absorption in the UVA region up to 380 nm. At 400 nm, the percent transmission is about 9.8 percent.

Figure 2:
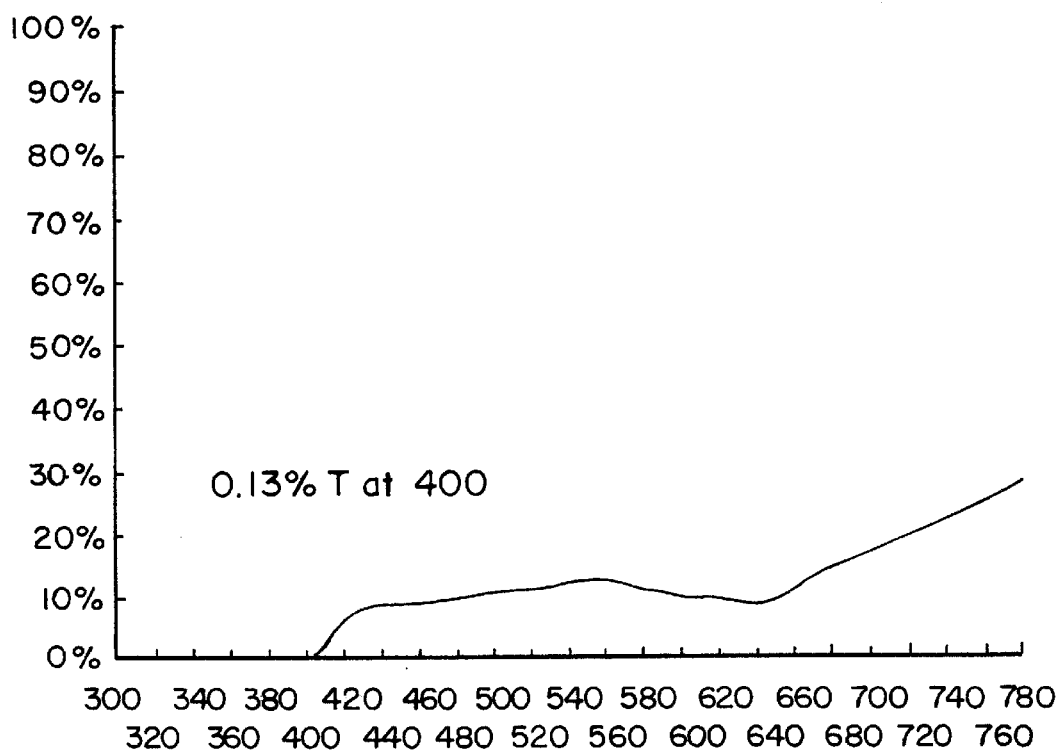
FIG. 2 is a transmission spectrum for a laminate whose adhesive includes a UV absorber that provides improved radiation absorption at 400 nm.

FIG. 2 is a corresponding transmission-wavelength plot for a similar laminate formed using the adhesive containing Cyasorb® UV-24 absorber. Again, substantially all UVA radiation is absorbed, but effective radiation absorption extends into the visible region, the percent transmission at 400 nm being only 0.13 percent.

Figure 3:
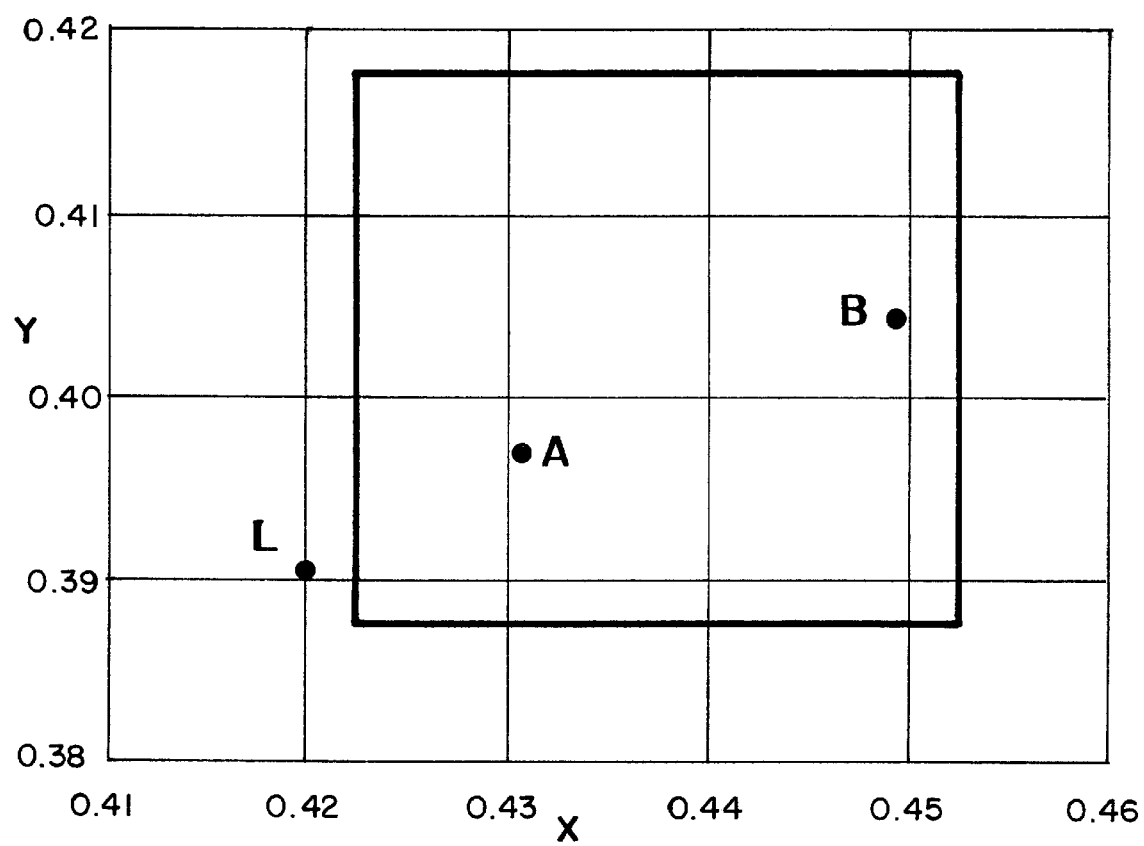
FIG. 3 is a CIE diagram illustrating hue shifts in laminate visible light transmission resulting from incorporation of dyes in the adhesive.

As noted above, dyes can also be incorporated in the adhesive to modify the transmission characteristics of a laminate. For example, calorimetric measurements of a brown polarizing laminate "L" formed from a brown polarizing film sandwiched between clear glass lenses showed it to have transmission characteristics that fell outside a specified color space of a CIE chromaticity diagram, as shown in FIG. 3. The color can be brought into specification by using an adhesive containing 2.6 mg Interplast® Red dye and 10.4 mg Interplast® Yellow dye in 20 grams of Loctite® 3491 to form laminate "A". Another calorimetrically acceptable laminate "B" can be obtained using an adhesive containing 3.0 mg Interplast® Red dye and 12.0 mg Interplast® Yellow dye in 20 grams of Loctite® 3491. Interplast® Red and Yellow dyes are available from Compton and Knowles, Inc.

Lens Testing

The lenses prepared as described above were tested for colorfastness and environmental stability. The "unblocked" lenses identified in the following tables are identical to the "blocked" lenses except that the unblocked lenses do not contain Tinuvin® 328. The "gray" and "brown" lenses differ only in the color of the polarizing film used to make the laminate. Some of the lenses tested were commercially available, as indicated.

To test for colorfastness, half of a lens was irradiated at 0.47 watts/m² UVA for 60 hours (the unirradiated side is shielded) at about 50% relative humidity. The temperature was maintained at 63° C. The lens was removed from the testing chamber and, under 40 watt fluorescent light, inspected for changes in color, fading or degradation.

The environmental stability test was conducted by placing a finished lens into a closed chamber with a cavity temperature of 200° F. for 96 consecutive hours. The lens is then cooled for approximately 1 day and examined for cosmetic and functional defects such as loss of polarizing efficiency, chips, fractures, distortion, looseness and gaps.

TABLE 1

Loss in Polarization Efficiency (%) After Testing

|  | Environmental Test | Colorfastness |
| --- | --- | --- |
| Brown Unblocked | 3.24 | 0.40 |
| Gray Unblocked | 0.02 | 0.02 |
| Brown Blocked | 7.02 | 0.05 |
| Gray Blocked | 0.03 | 0.02 |
| Commercial Lens #1 | 90.83 | 6.46 |
| Commercial Lens #2 | 39.67 | 3.12 |

TABLE 2

Increase in % Transmittance After Testing

|  | Environmental Test | Colorfastness |
| --- | --- | --- |
| Brown Unblocked | 1.40 | 5.00 |
| Gray Unblocked | 1.15 | 2.98 |
| Brown Blocked | 1.53 | 1.50 |
| Gray Blocked | 1.68 | 0.77 |
| Commercial Lens #1 | 18.63 | 5.26 |
| Commercial Lens #2 | 13.03 | 2.80 |

TABLE 3

Increase in UVA % Transmittance

|  | Environmental Test | Colorfastness |
| --- | --- | --- |
| Brown Unblocked | 1.86 | 4.87 |
| Gray Unblocked | — | 2.33 |
| Brown Blocked | 0 | 0.03 |
| Gray Blocked | 0 | 0 |
| Commercial Lens #1 | 0.5 | 0.10 |
| Commercial Lens #2 | 0.47 | 0.20 |

The invention has been described in detail for the purpose of illustration, but it is understood that such detail is solely for that purpose, and variations can be made therein by those skilled in the art without departing from the spirit and scope of the invention, which is defined by the following claims.

What is claimed:

1. An improved sunglass lens laminate comprising a first lens portion, a second lens portion, and an adhesive binding the first and second lens portions together;
   wherein the improvement comprises incorporating in the adhesive
   (1) an ultraviolet absorber in an amount sufficient to block substantially all solar radiation up to about 400 nm, and
   (2) a dye to provide selected visible light transmission characteristics to the laminate.

2. The lens laminate of claim 1 wherein the lens laminate further comprises a polarizing film adhered between the first and second lens portions.

3. The lens laminate of claim 1 wherein the adhesive contains a photoinitiator.

4. The lens laminate of claim 3 wherein the photoinitiator is selected from the group consisting of ultraviolet photoinitiators, visible light photoinitiators, and mixtures thereof.

5. The lens laminate of claim 1 wherein the ultraviolet absorber is selected from the group consisting of benzotriazoles, benzophenones, and derivatives of benzotriazoles and benzophenones.

6. The lens laminate of claim 5 wherein the ultraviolet absorber is a benzophenone or benzophenone derivative.

7. The lens laminate of claim 6 wherein the ultraviolet absorber is 2,2'-dihydroxy-4-methoxybenzophenone.

8. The lens laminate of claim 1 wherein the amount of ultraviolet absorber incorporated in the adhesive is sufficient to block at least 99.9 percent of solar UVA radiation.

9. The lens laminate of claim 1 wherein the ultraviolet absorber is incorporated in the adhesive in an amount from about 1 weight percent to about 5 weight percent.

10. The lens laminate of claim 9 wherein the ultraviolet absorber is incorporated in the adhesive in an amount from about 1.5 weight percent to about 2.5 weight percent.

11. The lens laminate of claim 1 wherein the dye is selected from the group consisting of azo dyes, metallized azo dyes, and mixtures thereof.

12. The lens laminate of claim 1 wherein the dye is incorporated in the adhesive in an amount from about 0.001 weight percent to about 1.0 weight percent.

13. The lens laminate of claim 12 wherein the dye is incorporated in the adhesive in an amount from about 0.01 weight percent to about 0.10 weight percent.

14. The lens laminate of claim 1 wherein at least one of the lens portions is made from glass.

15. The lens laminate of claim 1 wherein both of the lens portions are made from glass.

16. The lens laminate of claim 1 formed by adhesive curing at a temperature not exceeding 140° F.

17. The lens laminate of claim 16 formed by adhesive curing at a temperature not exceeding 120° F.

18. An improved polarized sunglass lens laminate comprising a first lens portion, a second lens portion, a polarizing film disposed between the first and second lens portions, and an adhesive binding the two lens portions and the polarizing film together;
   wherein the improvement comprises incorporating in the adhesive
   (1) an ultraviolet absorber in an amount sufficient to block substantially all solar radiation up to about 400 nm, and
   (2) a dye to provide selected visible light transmission characteristics to the laminate.

19. The lens laminate of claim 18 wherein the adhesive comprises a visible light photoinitiator, visible light being used to cure the adhesive to bind the two lens portions and the polarizing film together.

20. The lens laminate of claim 18 wherein the adhesive is a urethane-modified acrylic adhesive.

21. The lens laminate of claim 18 formed by adhesive curing at a temperature not exceeding 140° F.

22. The lens laminate of claim 21 formed by adhesive curing at a temperature not exceeding 120° F.

23. The lens laminate of claim 18 wherein the ultraviolet absorber is selected from the group consisting of benzotriazoles, benzophenones, and derivatives of benzotriazoles and benzophenones.

24. The lens laminate of claim 18 wherein the amount of ultraviolet absorber incorporated in the adhesive is sufficient to block at least 99.9 percent of solar UVA radiation.

25. The lens laminate of claim 18 wherein the amount of ultraviolet absorber incorporated in the adhesive is within the range from about 1 weight percent to about 5 weight percent.

26. The lens laminate of claim 25 wherein the amount of ultraviolet absorber incorporated in the adhesive is within the range from about 1.5 weight percent to about 2.5 weight percent.

27. The lens laminate of claim 18 wherein the dye is selected from the group consisting of azo dyes, metallized azo dyes, and mixtures thereof.

28. The lens laminate of claim 18 wherein the dye is incorporated in the adhesive in an amount from about 0.001 weight percent to about 1.0 weight percent.

29. The lens laminate of claim 28 wherein the dye is incorporated in the adhesive in an amount from about 0.01 weight percent to about 0.10 weight percent.

* * * * *